H. W. DYER.
TIRE CONSTRUCTION.
APPLICATION FILED MAR. 17, 1911.
1,090,605.
Patented Mar. 17, 1914.
2 SHEETS—SHEET 1.
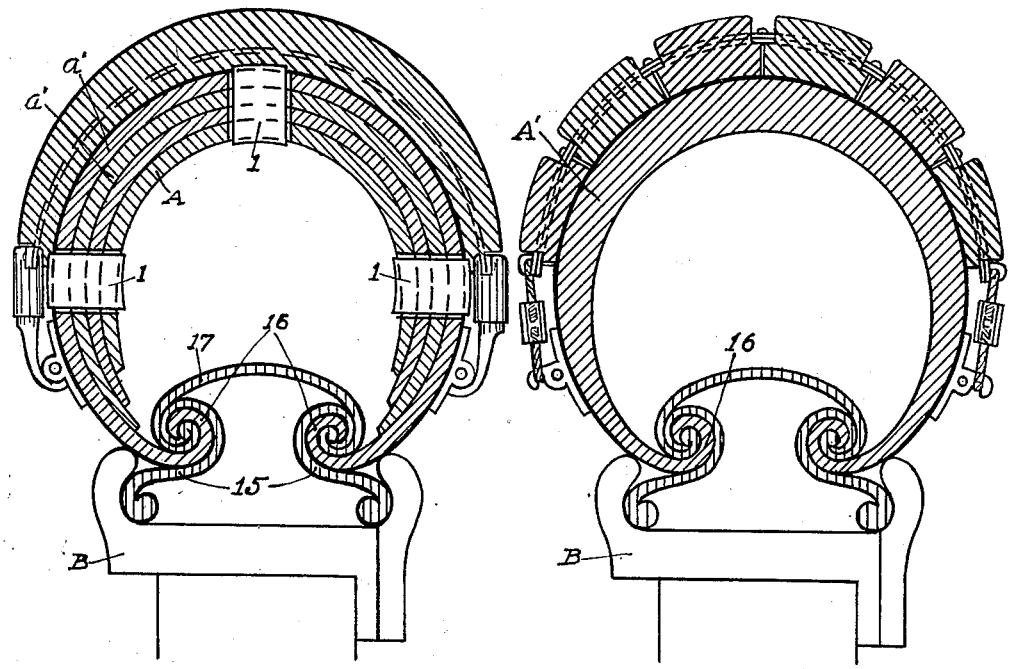
·FIG·1·  ·FIG·2·
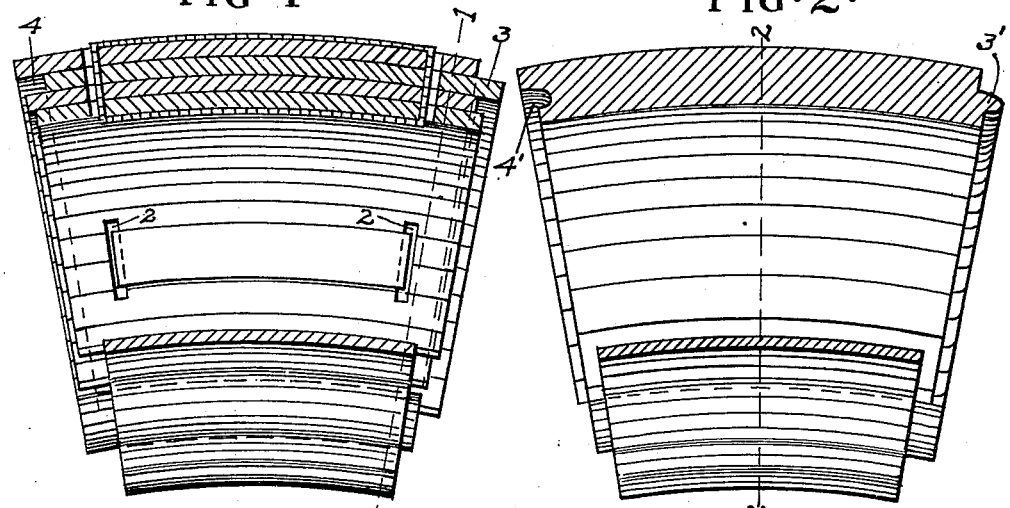
·FIG·3·  ·FIG·4·
WITNESSES
INVENTOR
Harry W. Dyer
BY
Lewis J. Doolittle
ATTORNEY H. W. DYER.
TIRE CONSTRUCTION.
APPLICATION FILED MAR. 17, 1911.
1,090,605.
Patented Mar. 17, 1914.
2 SHEETS—SHEET 2.
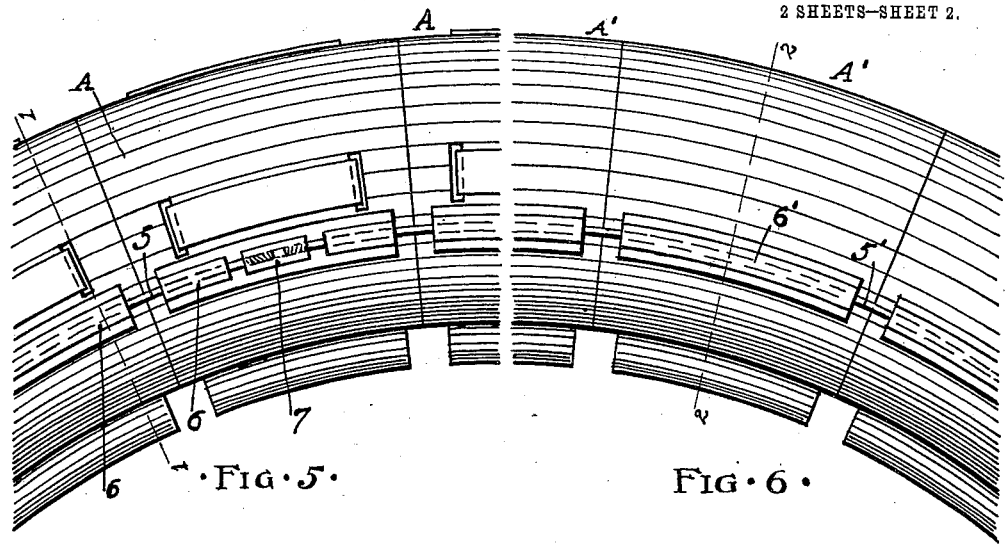
FIG. 5.    FIG. 6.
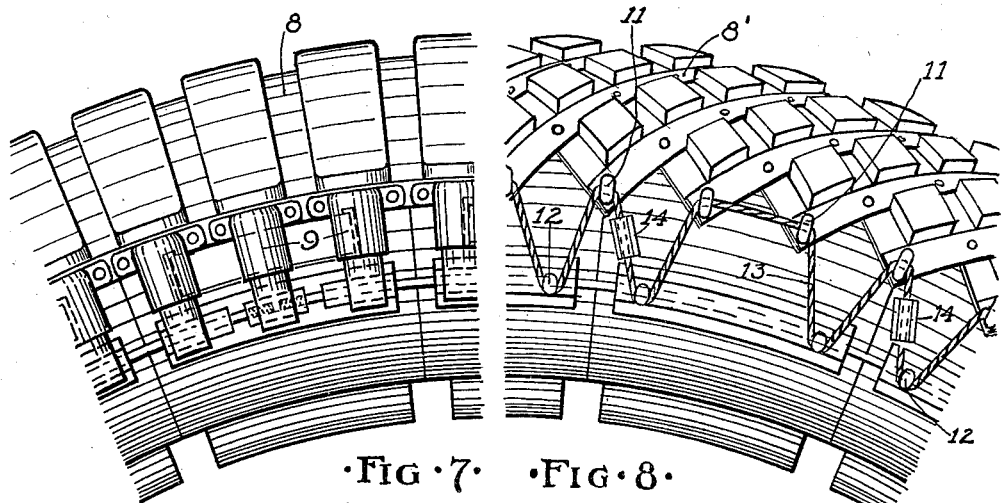
FIG. 7.    FIG. 8.
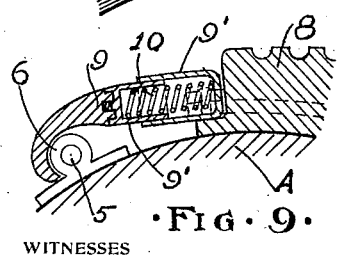    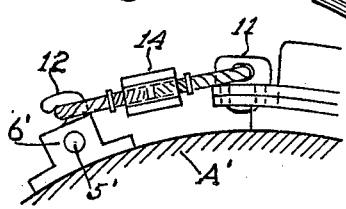
FIG. 9.    FIG. 10.
WITNESSES    INVENTOR
Harry W. Dyer
BY
Lewis J. Doolittle
ATTORNEY

UNITED STATES PATENT OFFICE.

HARRY W. DYER, OF EAST ORANGE, NEW JERSEY.

TIRE CONSTRUCTION.

1,090,605.  Specification of Letters Patent.  Patented Mar. 17, 1914.

Application filed March 17, 1911. Serial No. 615,053.

*To all whom it may concern:*

Be it known that I, HARRY W. DYER, a citizen of the United States, and resident of East Orange, Essex county, New Jersey, have invented certain new and useful Improvements in Tire Construction, of which the following is a specification.

This invention relates to improvements in resilient tires for vehicle wheels.

The invention is comprised particularly of a special construction of the tire wherein the body of the latter is made in sections peculiarly connected together and to the rim of the wheel.

For a full understanding of the present invention, reference is to be had to the following detail description and to the accompanying drawings, in which—

Figure 1 is a cross section on the line 1—1 of Fig. 3, showing the invention applied to the rim of a wheel; Fig. 2 is a similar view of a modified embodiment of the invention; Fig. 3 is a longitudinal vertical section of one of the sections of the tire, the tread or covering being removed; Fig. 4 is a similar view of the modification shown in Fig. 2; Fig. 5 is a fragmentary side view of the tire construction of Figs. 1 and 3, the tread being detached; Fig. 6 is a similar view of the modified construction; Fig. 7 is a fragmentary side elevation of the tire with the tread applied; Fig. 8 is a similar view of the modified embodiment; Fig. 9 is a fragmentary sectional view of the connecting means between the tread and the body of the tire; Fig. 10 is a view similar to Fig. 9, showing the modified means used in Fig. 8.

Throughout the following detail description and on the several figures of the drawings, similar parts are referred to by like reference characters.

The present tire construction contemplates the provision of a body composed of a plurality of sections disposed with the ends adjacent to one another to form a continuous member, the various sections being connected together by special means, promoting their individual and combined resiliency, a tread or covering extending over the outermost portion of the sectional body for the customary purpose of protecting the same and affording a surface especially designed to resist wear.

Specifically describing the preferred embodiment of the invention, as illustrated in Figs. 1, 3, 5, 7 and 9, it will be observed that each section A of the tire body is of laminated construction, being composed of a plurality of superposed members $a'$, said members $a'$ being of approximately circular form and received one within the other by reason of such construction. The members $a'$ form a composite section A and said members are connected together by a plurality of bands 1 which are passed through slots 2 with which each member $a'$ is provided, said slots being slightly larger than the cross-sectional area of the metal strip from which the bands are preferably made, permitting slight relative movement of the sections $a'$ such as necessary to afford the resiliency desired.

Each section A of the tire is formed at one end with a projection 3 and at its opposite end with a recess 4, and when the sections A are assembled, the projection 3 of one section engages in the recess 4 of an adjacent section, thereby affording an interlocking connection between adjacent ends of all of the sections.

The tire sections A are connected together against end-wise separation by means of flexible members 5 at opposite sides of the tire body, said members 5 passing through sleeves or tubular members 6, one or more of which are applied to opposite sides of each section A. A turn-buckle 7 may be interposed in the length of the connections or members 5 in order to permit of ready detachment and assemblance of the sections A, and to take up slack in the connections 5 under actual conditions of service. A suitable detachable tread is provided for the tire, being shown at 8 in Fig. 7, said tread being made of leather or any similar material and held in place by means of hooks 9 attached at one end to the edges of the tread and adapted to engage over the tubular members or sleeves 6 which are applied to the opposite sides of the sections A. Preferably the hooks 9 each comprise a shank composed of sections 9' yieldably connected together by springs 10 housed in hollow portions of said sections. The springs 10 in the hooks 9 afford take-up devices or yieldable connections between the tread and the tire necessary, having in view the resilient qualities of the latter.

The modification of the invention illustrated in Figs. 2, 4, 6, 8 and 10 embodies the same principles of construction as the preferred form hereinbefore described, excepting that the entire body is composed of single or unitary spring or resilient sections A', the same being interlocked at opposite ends by the projections 3' and recesses 4'. The sections A' of the modification are connected together by the tubular members 6' and the flexible members or connections 5' passing through the members 6'.

The tread used in the modification is different from that hereinbefore described, being shown at 8' in Fig. 8 and composed of a suitable body overlapping the various sections A' in the customary way, said body being prevented from displacement by means of the provision of eyes 11 on the opposite edges of the tread and hooks 12 of the tubular members 6', flexible members 13 being arranged at opposite sides of the tire and interlaced with the eyes 11 and hooks 12 to thereby connect the tread to the various sections of the tire body. Turnbuckles 14 may be interposed at intervals in the length of each member 13.

Both the preferred and modified forms of the tire body, as hereinbefore described, are connected to the rim B of the wheel, the latter not being shown, by the same means, such means being composed primarily of S-shaped hooks 15 interlocking at the outer ends with the opposite sides of the rim B and interlocking at the inner ends with curved flanges 16 formed on the lower spaced edges of each section A' of the tire body. Said flanges 16 not only interlock with the hooks 15 in the manner above specified but they are also connected together by means of clips 17 formed at opposite ends with hooks engaging the members 15 and 16 at the points where the latter are interlocked. The connections between the separate sections of the tire body and the rim B are advantageously employed to promote yieldability or resiliency of the tire as a whole.

Having thus described the invention, what is claimed as new is:

1. A resilient tire consisting of a body of approximately circular form, and the opposite sides of which are formed with inwardly and upwardly extending hooks, clips connecting said hooks together, a rim, and spaced hooks of S-shape interlocked at their outer ends with opposite sides of the rim and interlocked at their inner ends with the interlocked portions of the clips and hooks of the tire body.

2. A resilient tire comprising a body composed of sections, each section consisting of a spring or resilient member of approximately circular form provided at its lower edges with spaced hooks curving upwardly into the space surrounded by the body of the section, clips connecting the hooks of the section together, a rim, and hooks interlocking with the rim and with the hooks of the spring section, connecting the latter with the rim.

3. A resilient tire composed of a body comprising a plurality of superposed spring members of approximately circular form, the lowermost of said members being inclosed by the outermost member, a rim, means connecting the rim with the outermost spring members, the superposed spring members being provided with registering slots, and bands passing through said slots and connecting the spring members together.

Signed at New York city, in the county of and State of New York, this 7th day of March 1910.

HARRY W. DYER.

Witnesses:
B. W. COULDOCK,
LEWIS J. DOOLITTLE.